US010168881B2

(12) United States Patent
Goyal et al.

(10) Patent No.: US 10,168,881 B2
(45) Date of Patent: Jan. 1, 2019

(54) INFORMATION INTERFACE GENERATION

(71) Applicant: Microsoft Corporation, Redmond, WA (US)

(72) Inventors: Ankur Goyal, Redmond, WA (US); Gabe Young, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 14/193,311

(22) Filed: Feb. 28, 2014

(65) Prior Publication Data

US 2015/0248225 A1    Sep. 3, 2015

(51) Int. Cl.
*G06F 3/048* (2013.01)
*G06F 3/0484* (2013.01)
*G06F 17/30* (2006.01)

(52) U.S. Cl.
CPC ...... *G06F 3/04847* (2013.01); *G06F 3/04842* (2013.01); *G06F 17/30905* (2013.01)

(58) Field of Classification Search
CPC ....................................................... G06F 3/048
See application file for complete search history.

(56) References Cited

U.S. PATENT DOCUMENTS

| 6,976,210 | B1 | 12/2005 | Silva et al. |
| 8,191,002 | B2 | 5/2012 | Lauridsen et al. |
| 2006/0277481 | A1* | 12/2006 | Forstall ............. G06F 17/30899 715/764 |
| 2007/0106952 | A1 | 5/2007 | Matas et al. |
| 2009/0132942 | A1* | 5/2009 | Santoro .................. G06F 3/0481 715/765 |
| 2009/0154758 | A1* | 6/2009 | Mansell ............ G06F 17/30011 382/100 |
| 2010/0205520 | A1* | 8/2010 | Parish ................... G06F 17/246 715/212 |

(Continued)

OTHER PUBLICATIONS

"International Search Report and Written Opinion Issued in PCT Patent Application No. PCT/US2015/017620", dated May 13, 2015, 9 pages.

(Continued)

*Primary Examiner* — Xuyang Xia
(74) *Attorney, Agent, or Firm* — Shook, Hardy and Bacon, L.L.P.

(57) ABSTRACT

One or more techniques and/or systems are provided for generating an information interface. For example, a user may select content within a webpage (e.g., a camera review section of a shopping webpage). The content may be captured from the webpage (e.g., a camera review, a camera price, a camera image, etc.). An information interface may be generated for the content, and the content may be populated within the information interface. For example, a standalone application and/or an operating system interface (e.g., a tile) may be populated with the camera review, the camera price, the camera image, and/or other information from the camera review section of the shopping webpage. The information interface may be dynamically updated based upon a content update for the content from the webpage. For example, pricing information, displayed through the information interface, may be updated based upon a sale price being posted to the shopping webpage.

20 Claims, 11 Drawing Sheets

(56) References Cited

U.S. PATENT DOCUMENTS

| | | | | |
|---|---|---|---|---|
| 2010/0228777 A1* | 9/2010 | Imig | ................. | G06F 17/30699 707/772 |
| 2011/0109643 A1 | 5/2011 | Bettis et al. | | |
| 2011/0307883 A1 | 12/2011 | Hilerio et al. | | |
| 2012/0143845 A1* | 6/2012 | Jiang | ................. | G06F 17/30864 707/710 |
| 2012/0192082 A1 | 7/2012 | Bakalov et al. | | |
| 2012/0240030 A1* | 9/2012 | Shriber | ............. | G06F 17/30867 715/234 |
| 2013/0198145 A1 | 8/2013 | Avery et al. | | |
| 2013/0198610 A1* | 8/2013 | Mokhtarzada | .......... | G06F 3/048 715/234 |
| 2013/0346877 A1* | 12/2013 | Borovoy | ............... | H04L 65/403 715/753 |
| 2014/0019443 A1* | 1/2014 | Golshan | ............ | G06F 17/30867 707/723 |
| 2014/0108909 A1* | 4/2014 | Geelnard | .......... | G06F 17/30902 715/234 |
| 2014/0253458 A1* | 9/2014 | Patel | .................... | G02B 27/017 345/173 |
| 2014/0282029 A1* | 9/2014 | Vishria | ............... | H04L 29/0809 715/738 |

OTHER PUBLICATIONS

Williams, Simon "Create Web Clip Widgets for Dashboard", Published on: Dec. 12, 2010, Available at: http://web.archive.org/web/20101126064339/http://www.switchingtomac.com/tutorials/create-web-clip-widgets-for-dashboard/.

Greenberg, et al., "Generating Custom Notification Histories by Tracking Visual Differences between Web Page Visits", In Proceedings of Graphics Interface , Jun. 7, 2006, 8 pages. http://dl.acm.org/citation.cfm?id=1143117.

Hong, et al., "SparTag.us: a low cost tagging system for foraging of web content", In Proceedings of the working conference on Advanced visual interfaces, May 28, 2008, 8 pages. http://citeseerx.ist.psu.edu/viewdoc/download?rep=rep1&type=pdf&doi=10.1.1.164.2935.

Eagan, et al., "The Buzz: Supporting User Tailorability in Awareness Applications", In Proceeding of the twenty-sixth annual SIGCHI conference on Human factors in computing systems, Apr. 5, 2008. pp. 10 http://www.cc.gatech.edu/~stasko/papers/chi08-buzz.pdf.

Schraefel, et a., "Hunter Gatherer: Interaction Support for the Creation and Management of Within-Web-Page Collections", In Proceedings of the 11th international conference on World Wide Web, May 7, 2002. pp. 10 http://eprints.soton.ac.uk/257677/1/p172-schraefel.pdf.

"Microsoft Corporation (MSFT)", Retrieved on: Jan. 2, 2014, pp. 2 Available at: http://finance.yahoo.com/q?s=MSFT.

"Matrix Airfare Search", Retrieved on: Jan. 2, 2014, pp. 1 Available at: http://matrix.itasoftware.com.

"Yahoo Sports", Retrieved on: Jan. 2, 2014, pp. 1 Available at: http://sports.yahoo.com/mls/teams/sea/schedule).

Kidman, Nicole, "Vogue Germany", Published on: Aug. 30, 2013, pp. 4 Available at: http://nicolekidmanofficial.com/category/blog/.

"Chicken Alfredo and Rice Casserole", Published on: Dec. 30, 2009, pp. 3 Available at: http://www.recipe.com/chicken-alfredo-and-rice-casserole/.

"Bing Wallpaper", Published on: Mar. 2, 2013, pp. 1 Available at: http://bingwallpaper.com/.

Gaga, Lady "Follow Lady Gaga on Twitter Blog", Retrieved on: Jan. 2, 2014, pp. 2 Available at: https://twitter.com/gaga_blog.

"International Preliminary Report on Patentability Issued in PCT Application No. PCT/US2015/017620", dated May 18, 2016, 7 Pages.

"Office Action Issued in European Patent Application No. 15710644.4", dated Feb. 15, 2018, 9 Pages.

* cited by examiner

US 10,168,881 B2

INFORMATION INTERFACE GENERATION

BACKGROUND

Many users search, explore, discover, and/or interact with content using search interfaces. In an example, a user may search for information about entities, such as people and businesses, through a social network search interface. In another example, the user may search for vacation information through a web search interface. The user may bookmark a website so that the user may remember and/or later return to the website. For example, the user may bookmark a vacation broker webpage, a resort social network profile webpage, a vacation photo search results page, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for generating an information interface are provided herein. In an example, a user may navigate to a webpage (e.g., a videogame website). A selection of content within the webpage may be identified. For example, the user may select (e.g., click, highlight, a touch gesture, perform a gesture such as a circle gesture, click a selection button, etc.) a videogame review section of the videogame website as the content. The content may be captured from the webpage (e.g., an image of the videogame review section; markup and/or code associated with the videogame review section; an image recognition result of the videogame review section; a textual recognition result of the videogame review section; etc.).

An information interface may be generated for the content, and the information interface may be populated with the content. For example, the information interface may be populated with the image of the videogame review section, a link to the webpage, a videogame review extracted from the videogame review section, videogame purchasing functionality, etc. The user may configure the information interface (e.g., specify what information to display; specify an update interval for content populated within the information interface; etc.). In an example the information interface may be displayed through an operating system interface (e.g., an operating system tile). In another example, the information interface may be hosted as a standalone application.

The information interface may be updated based upon a content update associated with the content of the webpage. For example, responsive to determining that a new videogame review was added to the videogame review section, the new videogame review may be retrieved as a content update, and applied to the information interface (e.g., the new videogame review may be displayed through the information interface). In this way, the user may generate information interfaces based upon user selected portions of webpages and/or other types of content, and fresh content may be maintained within the information interfaces. In an example, an alert (e.g., a mobile device alert, an instant message, an email, a social network alert, etc.) may be provided to the user when new, updated, fresh, etc. content is added to the information interface. In an example, users may share information interfaces, such as content provided through such information interfaces, with other users. For example, the user may be provided with a suggestion of a shared information interface (e.g., a movie review information interface corresponding to a movie review section of a movie website) that was shared by a second user. Responsive to the user selecting the suggestion, a movie review information interface may be generated for the user based upon the shared information interface. In this way, users may share information interfaces and/or content with other users on multiple devices. In an example, an information interface can be displayed on multiple devices of a user, such as a laptop and a desktop, for example.

In an example, an interface management component, configured for generating an information interface, may be implemented on a client device. For example, the interface management component may retrieve the content from a remote source, such as a search engine server configured to access webpages, and may have access to an operating system of the client device for creation of the information interface. In another example, the interface management component may be implemented on a server that is remote from the client device. For example, the interface management component may generate the information interface remotely from the client device and may send the information interface to the client device for display.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
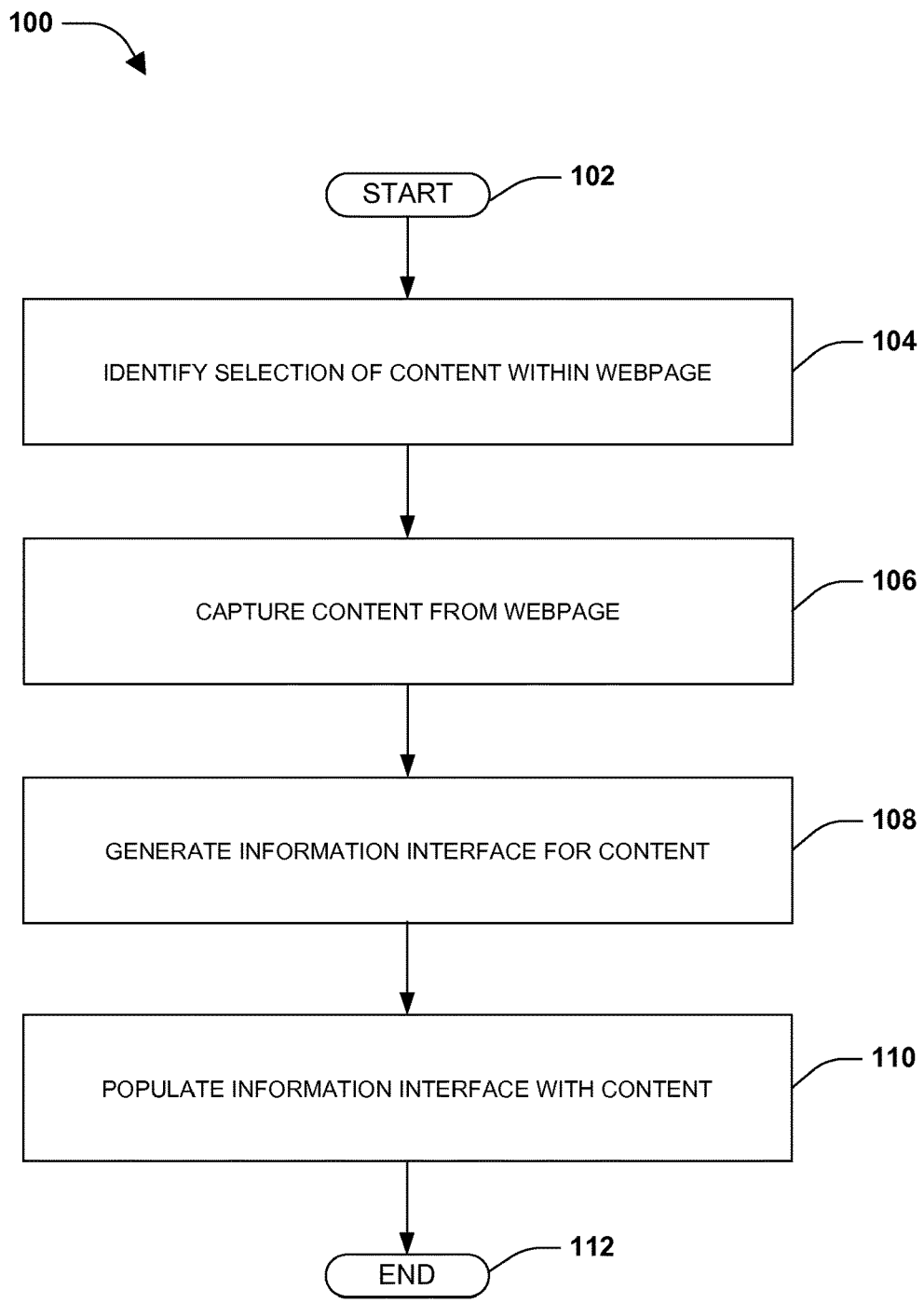
FIG. 1 is a flow diagram illustrating an exemplary method of generating an information interface.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for generating an information interface are provided. In an example, a user may explore various websites, such as while researching a home purchase. As provided herein, the user may link a webpage or portion thereof to an information interface (e.g., a dynamically generated application, information application comprising one or more information interfaces, an operating system interface such as a tile, etc.) that may be automatically refreshed and/or updated with content associated with the webpage. For example, a home foreclosure information interface may be generated based upon a selection of a home foreclosure section of a realtor website. The home foreclosure information interface may be populated with content from the home foreclosure section (e.g., current foreclosure listings near a location of interest to the user). The home foreclosure information interface may be automatically refreshed and/or updated based upon changes to the home foreclosure section of the realtor website, such as a new foreclosure listing. In this way, the user may easily access updated content that may be interesting to the user.

An embodiment of generating an information interface is illustrated by an exemplary method 100 of FIG. 1. At 102, the method starts. At 104, a selection of content within a webpage may be identified. For example, a selection of a camera section of a shopping webpage may be identified as the content (e.g., a user may perform a gesture selection such as drawing a circle around the camera section; the user may highlight the camera section; the user may select a content selection button dynamically displayed relative to the camera section based upon the user hovering a cursor near the camera section; etc.). It will be appreciated that the instant application, including the scope of the appended claims, is not to be limited by the examples provided herein. For example, in addition to a shopping webpage, a webpage may comprise a search results page, a social network profile, a map website, an image sharing website, etc. At 106, the content from the webpage may be captured. In an example, an image of the content may be captured. In another example, an image recognition technique, a textual recognition technique, a markup extraction technique, a programming code extraction technique, and/or other techniques may be performed on the content to understand the content, such as identifying a topic or field associated with the content (e.g., a camera topic, an electronic consumer good topic, a price topic, a sale topic, a user camera review topic, etc.).

At 108, an information interface may be generated for the content. In an example, the information interface may be linked to the webpage, such that the information interface may be dynamically updated with content updates associated with the webpage. In an example, a configuration interface, for configuring the information interface, may be exposed to the user. A user configuration for the information interface may be received through the configuration interface (e.g., a size such as a number of operating system tiles that are to be used for displaying the information interface; an assignment of the information interface to an operating system tile; an update frequency for refreshing the information interface with content updates associated with the shopping webpage; one or more fields to display such as a price field, a user review field, a seller field, etc.; a location such as for shipping prices; an option to dynamically create a standalone application for the information interface, etc.). In this way, the user configuration may be applied to the information interface.

At 110, the information interface may be populated with the content. In an example, an image of the content may be captured and used to populate the information interface. In another example, task completion functionality associated with the content may be populated within the information interface (e.g., purchasing functionality; write a review functionality that may be submitted to the shopping webpage; etc.). In another example, the topic, identified for the content, may be used to retrieve supplemental content (e.g., information from a photography website, information from a camera cleaning website, a link to a photography app available through an app store, information retrieved from a second source different than the webpage, advertisements and/or coupons, etc.). The information interface may be populated with the supplemental content.

The information interface may be displayed through various interfaces and/or applications. In an example, the information interface may be displayed through a standalone application (e.g., an application may be dynamically generated for the information interface; an information app may be populated with multiple information interfaces; etc.). In another example, the information interface may be displayed through a first operating system interface (e.g., an operating system tile of a homepage). In another example, responsive to determining that the content exceeds an operating system interface size, the information interface may be displayed across at least two operating system interfaces (e.g., adjacent operating system tiles). In another example, the information interface may be displayed through a shared operating system interface through which multiple information interfaces may be displayed. Various techniques may be used to rotate the shared operating system interface between information interfaces, such as a sequential order, a round robin order, a weighted order (e.g., user relevancy and/or popularity may be used for weighting), a recently updated order (e.g., a first recently updated information interface may be displayed for a threshold amount of time, and then a second recently updated information interface may be displayed), etc. In another example, the information interface may be displayed and/or synchronized through various devices, such as a first device (e.g., a mobile phone) and a second device (e.g., a personal computer), associated with the user.

The information interface may be updated based upon content updates for the content from the webpage. In an example, responsive to determining that a price has changed for a camera (e.g., a search engine may crawl the shopping webpage to determine whether a current state of the camera section is different than a prior state of the camera section, such as by using an image snapshot comparison technique or a textual comparison technique), a current state of the camera section may be captured as a second image (e.g., a content update). The second image may be populated within the information interface. In another example, responsive to determining that the content update corresponds to a camera stock quantity that is a purchase trigger for the user, an alert may be provided to the user (e.g., a mobile alert).

Information interfaces may be shared between users. In an example, responsive to receiving a share request for the information interface from the user, the information interface may be shared with a second user (e.g., the user may want to share camera ideas with a friend). In another example, a shared information interface may be received from the second user. The user may be provided with a suggestion of the shared information interface. Responsive to receiving a selection of the suggestion, a second information interface may be generated based upon the shared information interface. The user may specify a user configuration for the second information interface so that the second information interface may be personalized for the user (e.g., and thus may be different than the shared information interface of the second user).

In an example of generating an information interface, a user may access a search interface (e.g., a web search engine, a social network search interface, a photo search interface, etc.). Responsive to identifying user input of a user search query through the search interface, an information interface suggestion corresponding to the user input may be provided (e.g., the user may input "cleveland art mus", which may be used to identify a Cleveland art museum information interface that may be interesting to the user). Responsive to selection of the information interface suggestion, an information interface may be generated based upon the information interface suggestion.

Figure 2:
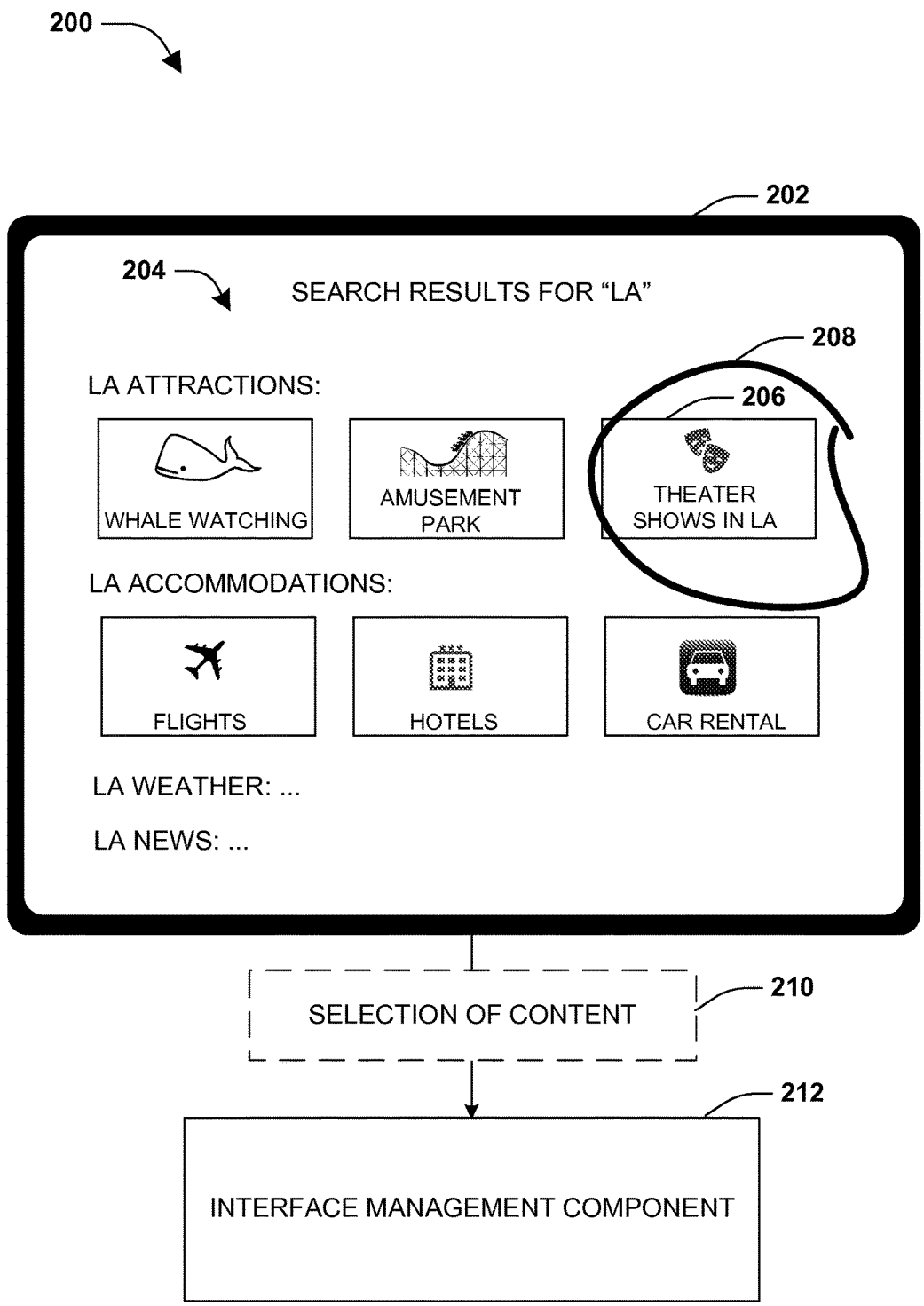
FIG. 2 is an illustration of an example of identifying a selection of content within a webpage.

FIG. 2 illustrates an example 200 of identifying a selection 210 of content within a webpage. A user may submit a search query "LA" through a device 202. Search results 204 for the search query "LA" may be provided to the user. For example, the search results 204 may comprise a whale-watching attraction section, an amusement park attraction section, a theater shows attraction section 206, and/or a variety of other search results. The user may perform a gesture selection 208 of the theater shows attraction section 206, which may be identified, by an interface management component 212, as the selection 210 of content. The interface management component 212 may generate an information interface based upon content within the theatre shows attraction section 206 (e.g., show times, ticket purchasing functionality, etc.).

Figure 3:
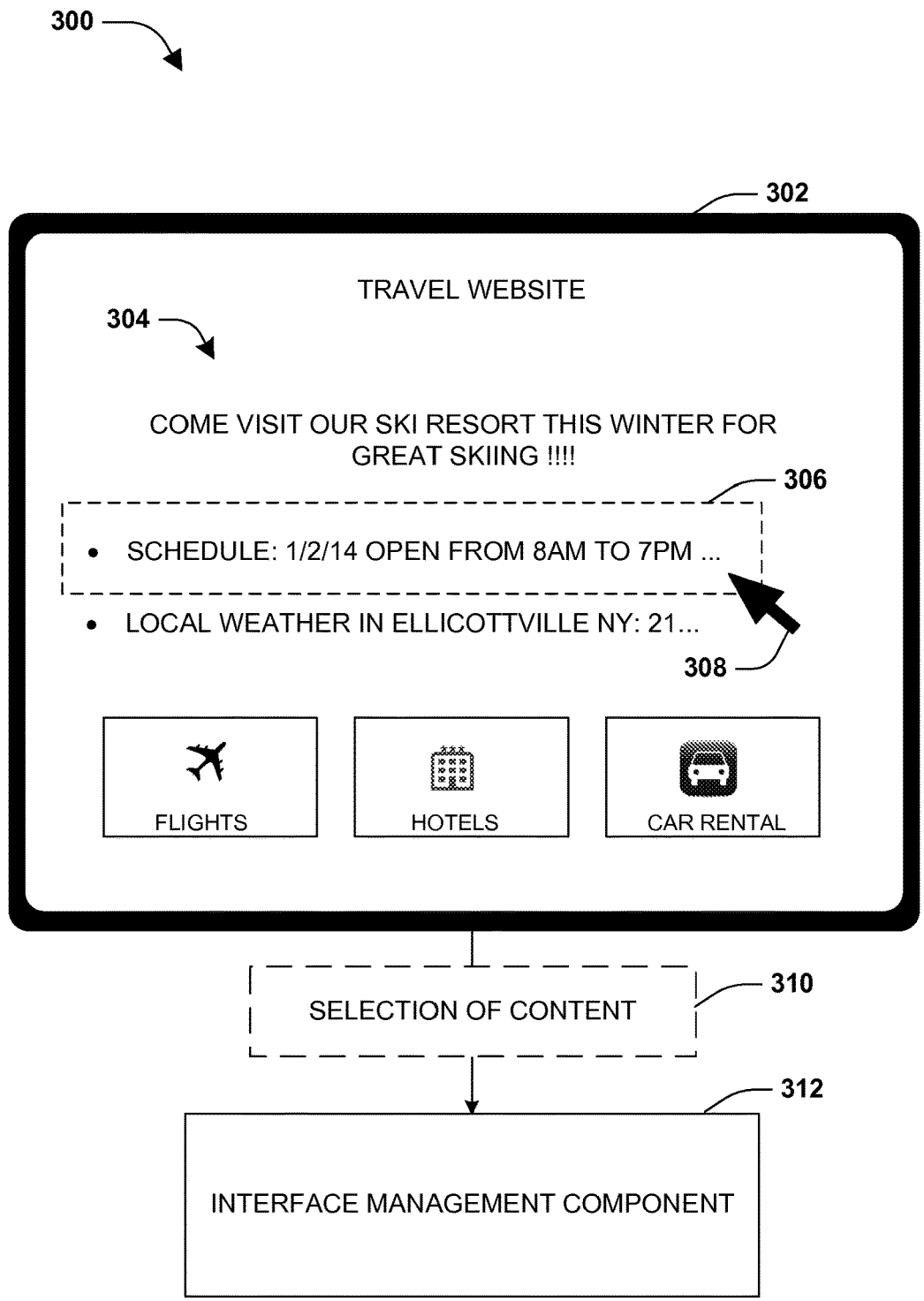
FIG. 3 is an illustration of an example of identifying a selection of content within a webpage.

FIG. 3 illustrates an example 300 of identifying a selection 310 of content within a webpage. A user may access a travel website 304 through a device 302. The travel website 304 may comprise various information for a ski resort, such as a ski schedule section 306, a local weather section, etc. The user may select the ski schedule section 306 using a cursor 308, which may be identified, by the interface management component 312, as the selection 310 of content. The interface management component 312 may generate an information interface based upon content within the ski schedule section 306 (e.g., hours of operation, schedule changes, closure alerts, etc.).

Figure 4:
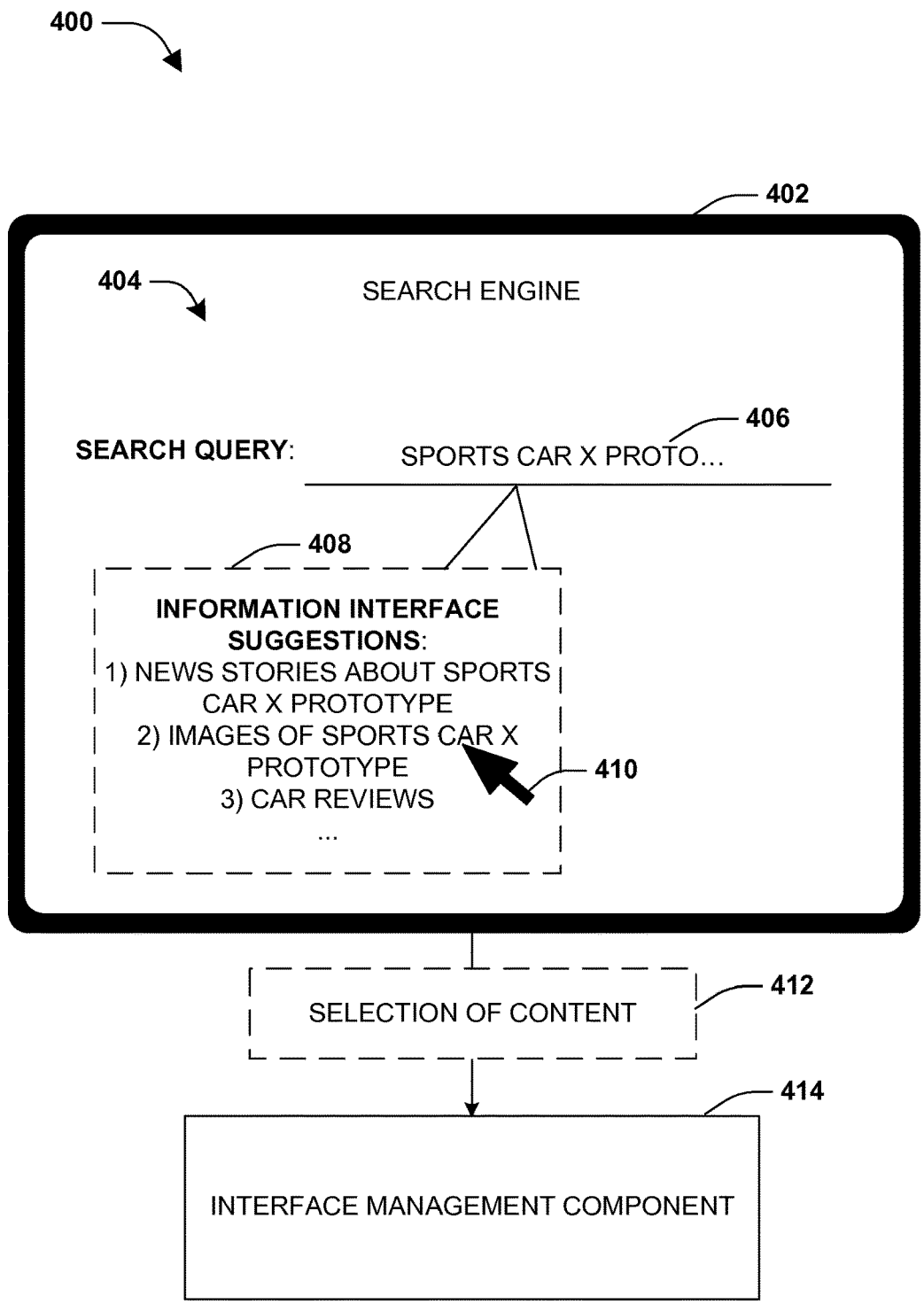
FIG. 4 is an illustration of an example of identifying a selection of content within a webpage.

FIG. 4 illustrates an example 400 of identifying a selection 412 of content within a webpage. A user may access a search engine 404 through a device 402. Responsive to identifying user input 406 of a user search query through the search engine 404 (e.g., the user may begin to type "sports car x proto"), one or more information interface suggestions 408 corresponding to the user input 406 may be provided (e.g., a news stories information interface suggestion, a car images information interface suggestion, a car reviews information interface suggestion, etc.). In an example, the user may select the car images information interface suggestion, which may be identified by the interface management component 414, as the selection 412 of content. The interface management component 414 may generate an information interface based upon the car images information interface suggestion.

Figure 5A:
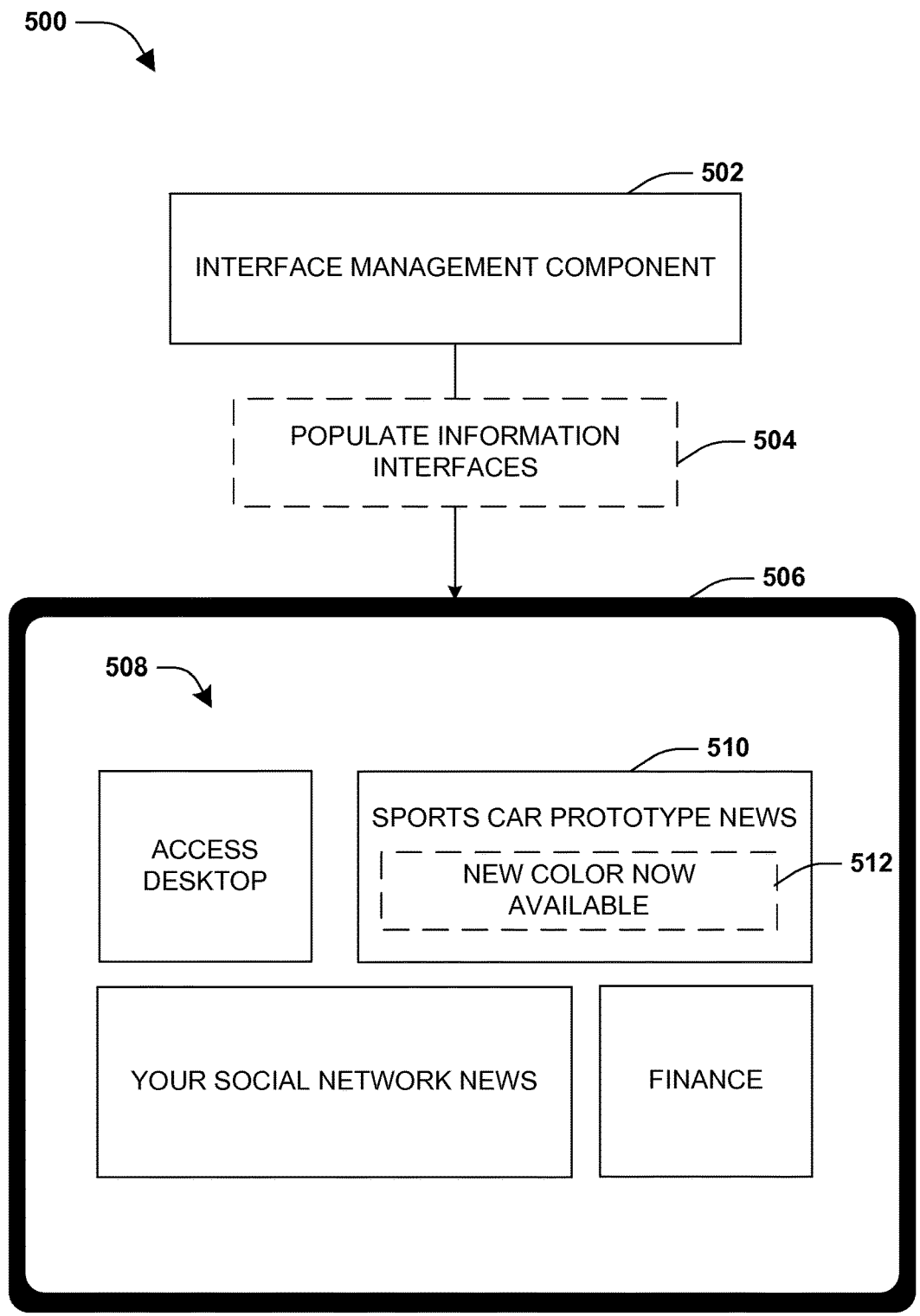
FIG. 5A is a component block diagram illustrating an exemplary system for generating an information interface.

FIG. 5A illustrates an example of a system 500 for generating an information interface. The system 500 comprises an interface management component 502. In an example, the interface management component 502 may identify a selection of content 512 within a webpage. For example, a user may have selected a sports car prototype news section of a car manufacturer webpage. The content 512 from the webpage may be captured, such as an image snapshot or textual information associated with a new color availability news story for the prototype sports car. The interface management component 502 may be configured to generate an information interface 510 for the content. For example, the interface management component 502 may display the information interface 510 through an operating system interface 508 of a device 506. The interface management component 502 may populate 504 the information interface 510 with the content 512.

Figure 5B:
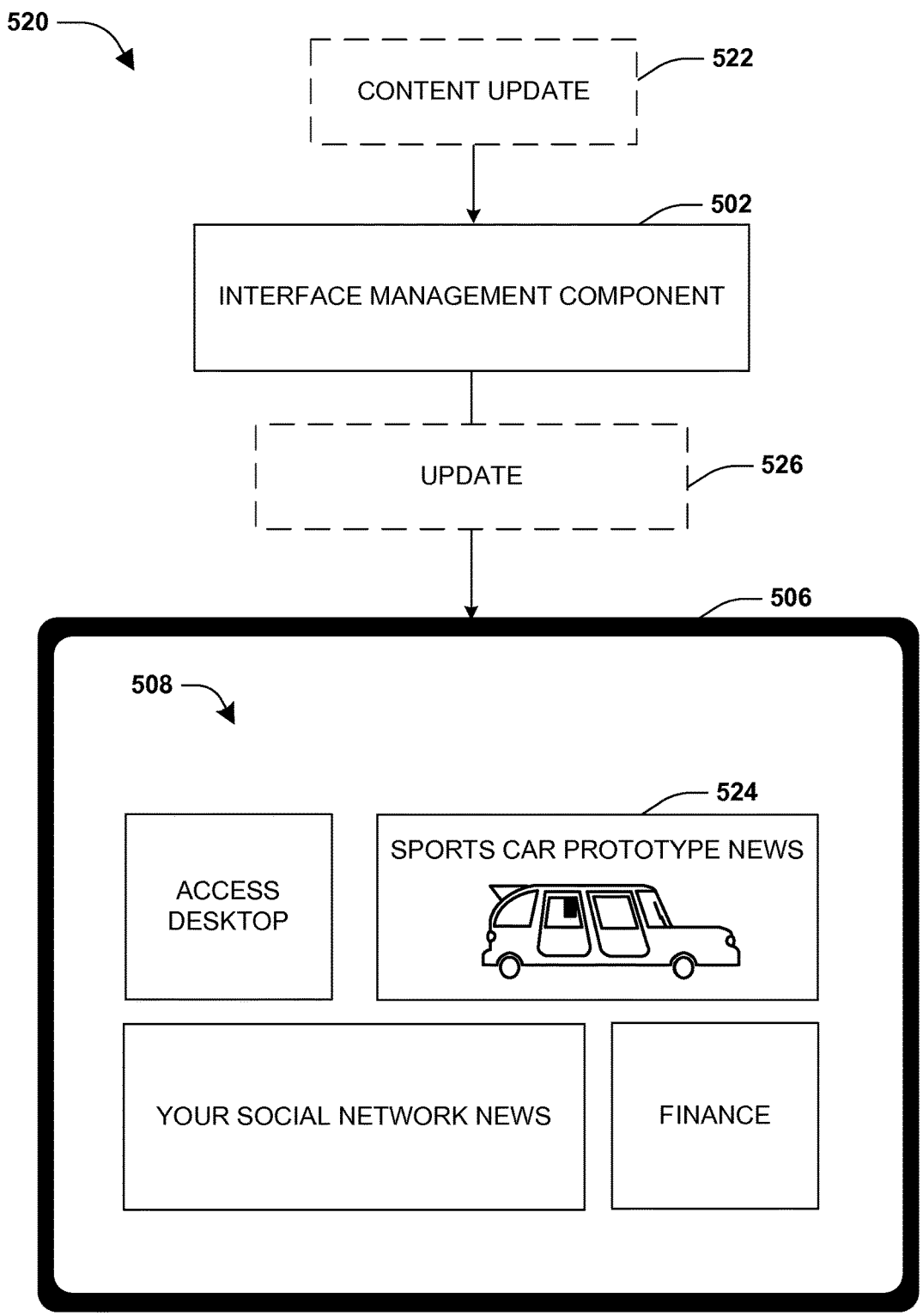
FIG. 5B is a component block diagram illustrating an exemplary system for generating an information interface.

FIG. 5B illustrates an example of a system 520 for updating 526 an information interface based upon a content update 522. The system 520 comprises an interface management component 502. In an example, the interface management component 502 may have generated and populated an information interface 510 with content 512 (e.g., a new color availability news story of a sports car prototype news section of a car manufacture webpage), as illustrated in FIG. 5A. The interface management component 502 may identify a content update 522 for the content, such as a new car image provided by the sports car prototype news section illustrating a prototype sports car in a new color. Accordingly, the interface management component 502 may update the information interface 510 based upon the content update 522 to create an updated information interface 524. In this way, information interfaces may be dynamically updated based upon content updates from webpages.

Figure 5C:
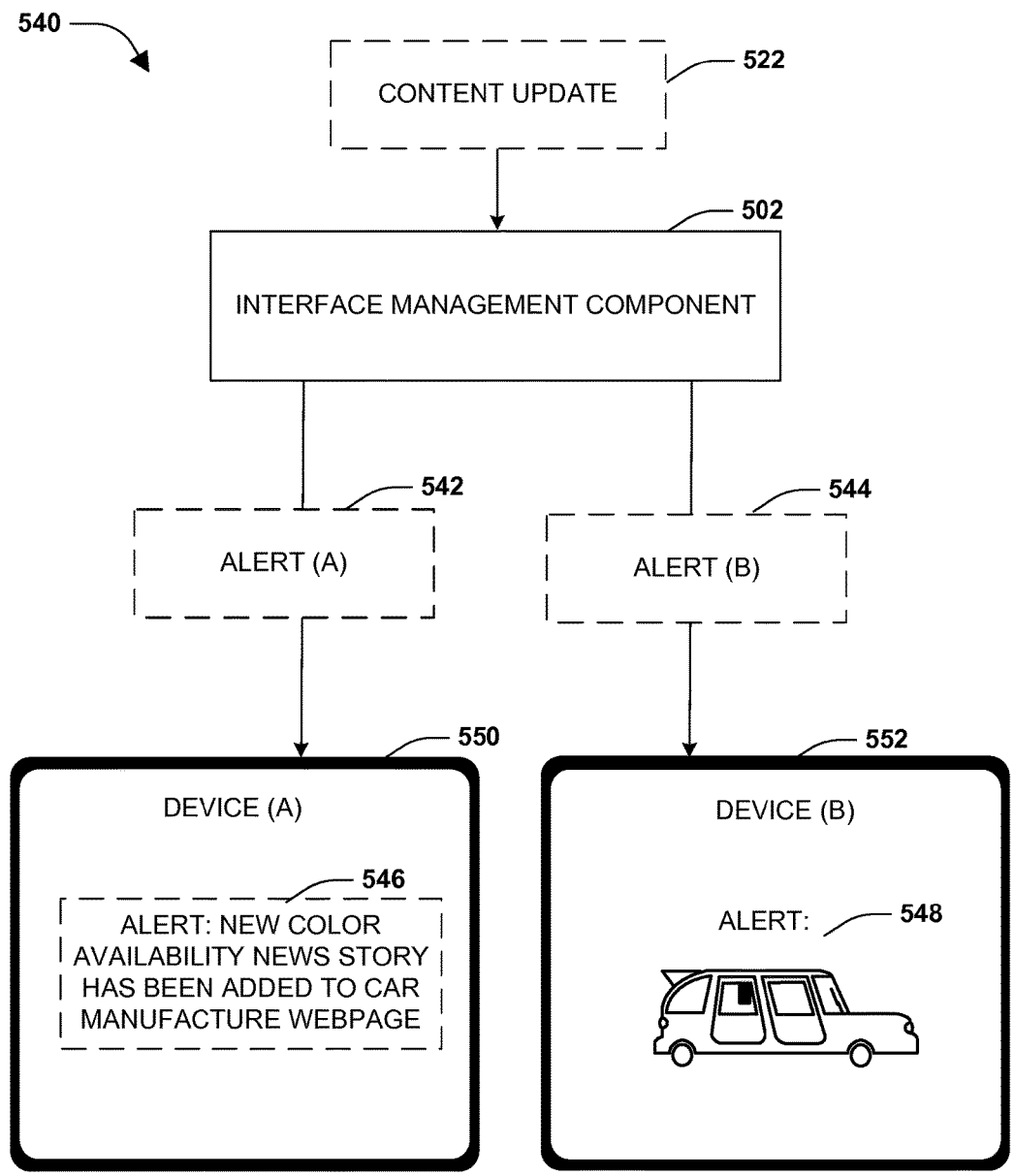
FIG. 5C is an illustration of an example of providing an alert of a content update.

FIG. 5C illustrates an example of providing an alert of a content update. In an example, an interface management component 502 may have generated and populated an information interface 510 for a user with content 512 (e.g., a new color availability news story of a sports car prototype news section of a car manufacture webpage), as illustrated in FIG. 5A. The interface management component 502 may identify a content update 522 for the content, such as a new car image provided by the sports car prototype news section illustrating a prototype sports car in a new color. Accordingly, the interface management component 502 may provide an alert (A) 542 of the content update 522 to a device (A) 550 of the user. For example, a textual alert 546 may be provided to a mobile device of the user (e.g., based upon a textual alert setting specified by the user for the mobile device). The interface management component 502 may provide an alert (B) 544 of the content update 522 to a device (B) 552 of the user. For example, an image alert 548 may be provided to a tablet device of the user (e.g., based upon an image alert setting specified by the user for the tablet device). For example, the image alert may flash, highlight, etc. an updated image depicting the prototype sports car in the new color. It will be appreciated that such alerts may be provided across one or more devices of the user (e.g., concurrently). For example, where multiple devices have information interfaces (e.g., comprising content synchronized across the devices), an alert can be provided based upon updates to content within the information interfaces. It will be appreciated that the information interfaces may be different for different devices and/or that that alerts may be different. For example, a smaller, less robust information interface may be displayed on a smartphone whereas a graphics rich information interface may be displayed on a laptop. A simple textual alert may thus be provided on the smartphone whereas a vivid imagery alert may be provided on the laptop, for example, where the different alerts may nevertheless be based upon the same update to content (e.g., synchronized within the information interfaces).

Figure 6:
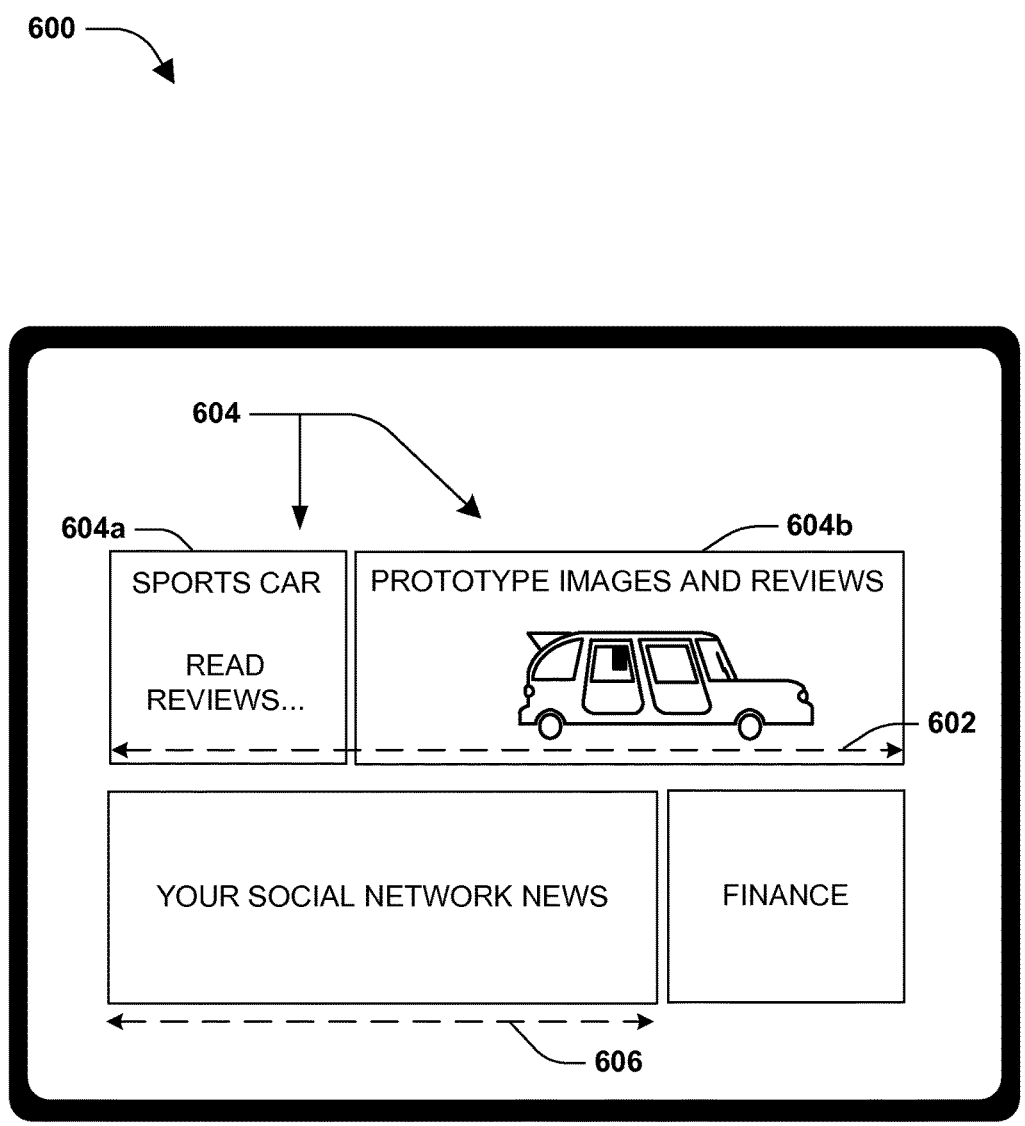
FIG. 6 is an illustration of an example of an information interface.

FIG. 6 illustrates an example 600 of an information interface 604. In an example, the information interface 604 may have been generated based upon a selection of content from a webpage, such as a first selection of a sports car prototype images section and a second selection of a sports car prototype reviews section of a car manufacturer webpage. A size 602 of the information interface 604 may exceed an operating system interface size (e.g., a maximum tile width of 606). Accordingly, the information interface 604 may be displayed across multiple operating system interfaces, such as a first operating system interface 604a for a first portion of the information interface 604 and a second operating system interface 604b for a second portion of the information interface 604. It will be appreciated that an image may be displayed across multiple information interfaces, such as where the image cannot be displayed as desired within a single information interface.

Figure 7:
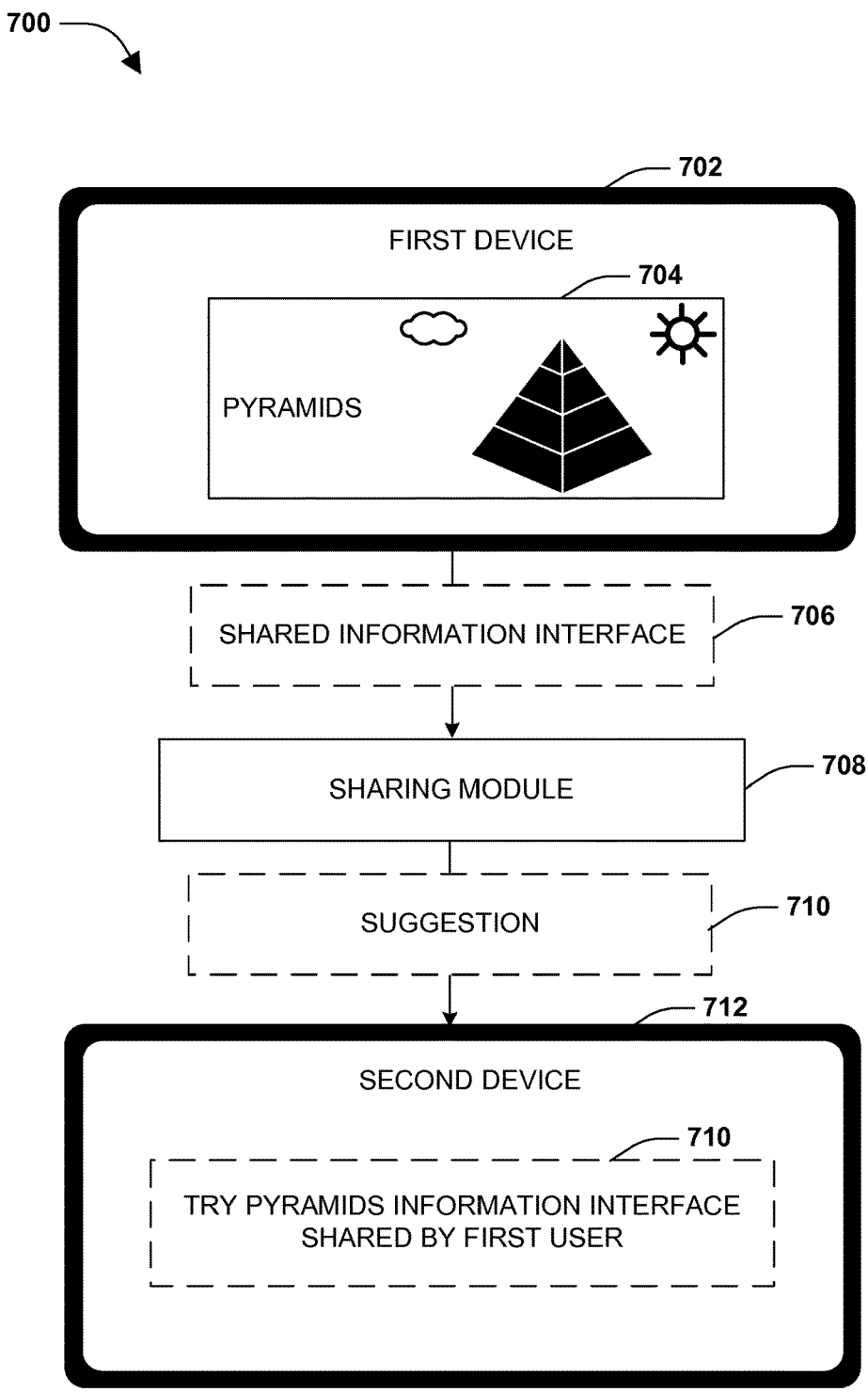
FIG. 7 is a component block diagram illustrating an exemplary system for sharing an information interface.

FIG. 7 illustrates an example of a system 700 for sharing an information interface. The system 700 may comprise a sharing module 708 associated with a first device 702 of a first user and/or a second device 712 of a second user. The sharing module 708 may receive a shared information interface 706 from the first device 702. For example, the shared information interface 706 may correspond to a pyramids information interface 704 that the first user may desire to share with the second user. The sharing module 708 may provide a suggestion 710 of the shared information interface 706 to the second device 712. Responsive to the second user selecting the suggestion 710, an instance of the pyramids information interface may be generated on the second device as a second information interface. In an example, the second information interface may be customized by the second user. For example, the second information interface may be updated with new content (if available) at a different frequency than the first information interface is updated. In this way, users may share information interfaces.

Figure 8:
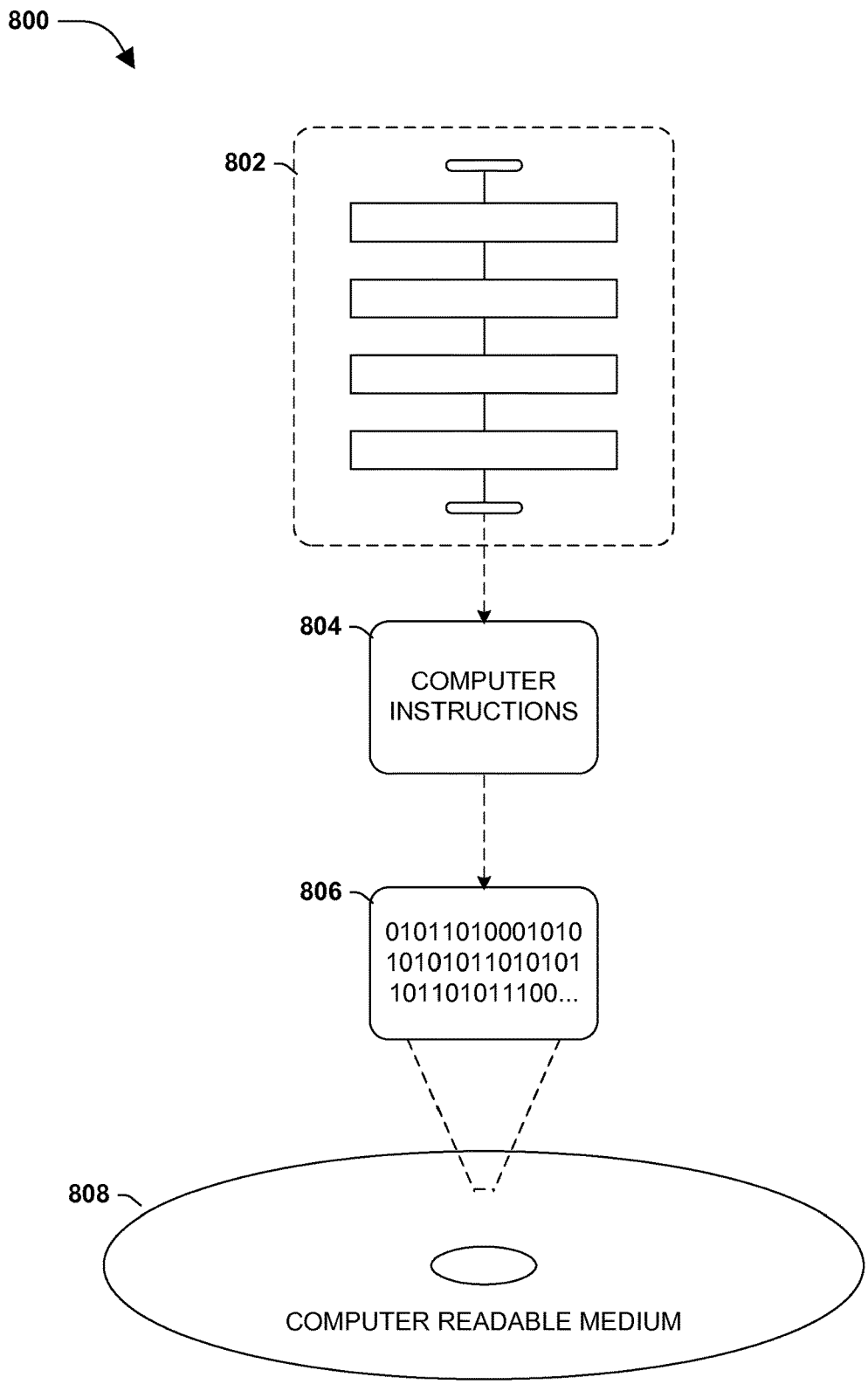
FIG. 8 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 100 of FIG. 1, for example. In some embodiments, the processor-executable instructions 804 are configured to implement a system, such as at least some of the exemplary system 500 of FIG. 5A, at least some of the exemplary system 520 of FIG. 5B, and/or at least some of the exemplary system 700 of FIG. 7, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
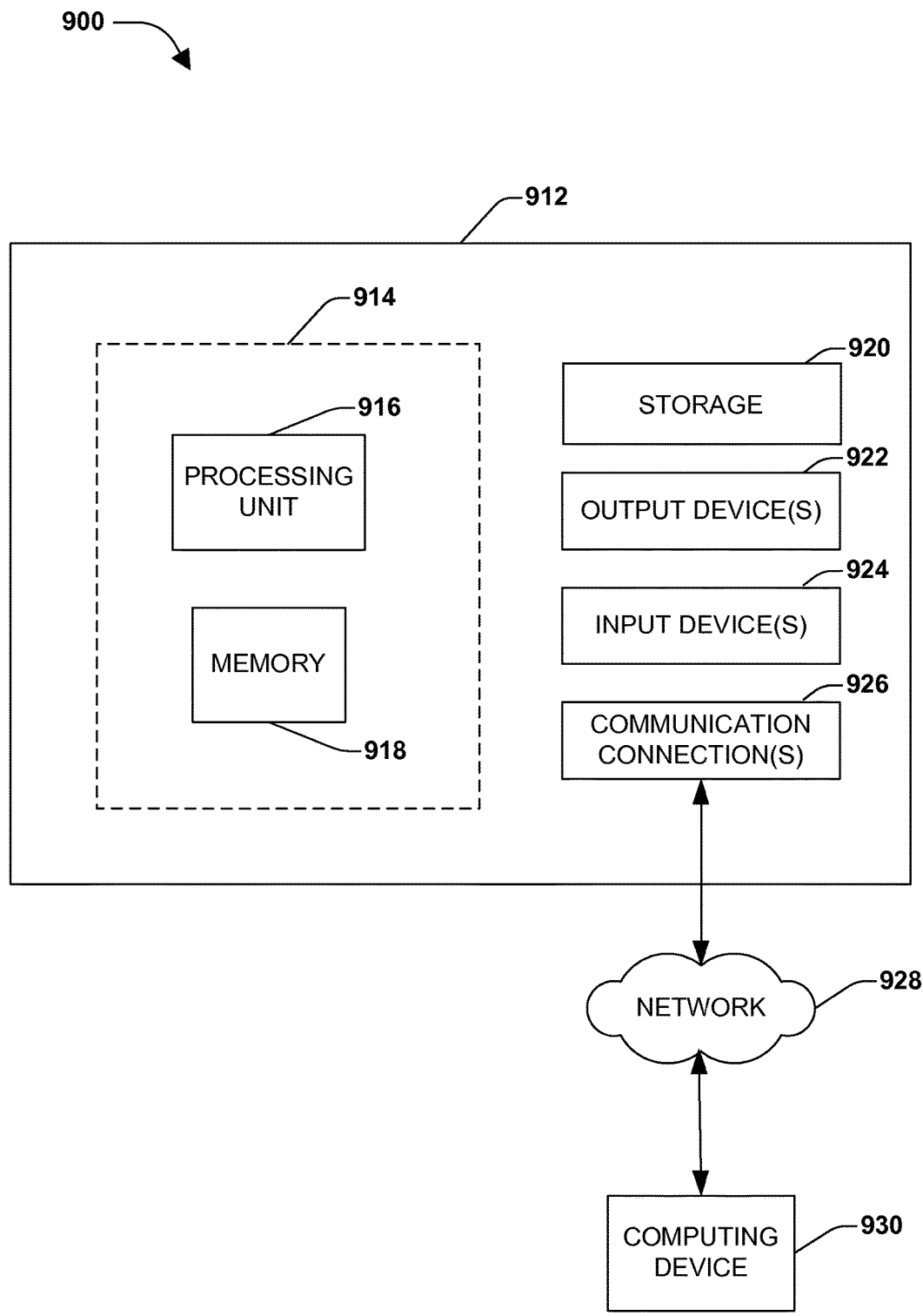
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Computer storage media does not, however, include propagated signals. Rather, computer storage media excludes propagated signals. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for generating an information interface, comprising:
identifying a selection of content within a webpage;
capturing the content from the webpage;
generating an information interface for the content;
populating the information interface with the content;
displaying the information interface in a shared operating system interface through which multiple other information interfaces are displayed, wherein the shared operating system interface is rotated between the information interface and the other information interfaces;
automatically updating the information interface with content from the webpage;
presenting an alert to a user that the information interface has been automatically updated;
responsive to identifying user input of a user search query through a search interface, and while the user is typing the user search query, providing a list of information interface suggestions corresponding to the user input, wherein each information interface suggestion in the list is a user-selectable item which describes a type of information interface comprising a topic that corresponds to the user input, wherein for each information interface suggestion, a selection of the information interface suggestion causes a corresponding information interface to be generated, wherein the corresponding information interface includes content captured from one or more associated webpages; and
responsive to receiving a selection of an information interface suggestion from the list of information interface suggestions, generating a second information interface that corresponds to the user input based upon the selected information interface suggestion.

2. The method of claim 1, comprising:
identifying a topic associated with the content;
retrieving supplemental content corresponding to the topic; and
updating the information interface with the supplemental content.

3. The method of claim 2, the retrieving supplemental content comprising:
retrieving the supplemental content from a second source different than the webpage.

4. The method of claim 1, the capturing the content comprising capturing an image of the content, and the populating comprising displaying the image through the information interface.

5. The method of claim 4, comprising:
identifying a content update for the content from the webpage;
capturing a second image of the updated content; and
displaying the second image through the information interface.

6. The method of claim 1, comprising
responsive to determining that the content exceeds an operating system interface size, displaying the information interface across at least two operating system interfaces.

7. The method of claim 1, comprising:
exposing a configuration interface to the user;
receiving a user configuration for the information interface through the configuration interface; and
applying the user configuration to the information interface.

8. The method of claim 1, comprising:
populating the information interface with task completion functionality associated with the content.

9. The method of claim 1, comprising:
displaying the information interface through a first device associated with a user and a second device associated with the user.

10. The method of claim 1, the identifying a selection of content comprising:
identifying a gesture selection of a portion of the webpage corresponding to the content.

11. The method of claim 1, comprising:
responsive to receiving a share request for the information interface from a first user, sharing the information interface with a second user.

12. The method of claim 1, comprising:
receiving a shared information interface from a second user;
providing a first user with a suggestion of the shared information interface; and
responsive to receiving a selection of the suggestion, generating a second information interface based upon the shared information interface.

13. The method of claim 12, the suggestion comprising a user configuration for generating the second information interface.

14. One or more computer storage media having computer-usable instructions embodied thereon which, when executed by one or more computing devices, perform a method for generating and sharing an information interface, comprising:
identifying a user selection of content within a webpage by a first user wherein the user selection comprises a touch gesture, a click on a selection button, or a cursor selection;
capturing the selected content from the webpage, wherein the captured content comprises a functionality to complete a task associated with the content;
generating an information interface for the content;
populating the information interface with the content;
populating the information interface with the functionality to complete the task associated with the content;
automatically updating the information interface with content from the webpage;
exposing a configuration interface to the user, comprising a parameter that indicates a number of operating system tiles to be used for displaying the information interface;
receiving a user input of the parameter indicating the number of operating system tiles to be used for displaying the information interface;
utilizing the indicated number of tiles to display the information interface wherein the information interface is displayed across the indicated number of tiles;
presenting an alert to the first user that the information interface has been automatically updated; and
responsive to receiving a share request for the information interface from the first user, sharing the information interface with a second user.

15. The media of claim 14, comprising:
identifying a topic associated with the content;
retrieving supplemental content corresponding to the topic; and
updating the information interface with the supplemental content.

16. The media of claim 15, the retrieving supplemental content comprising:
retrieving the supplemental content from a second source different than the webpage.

17. The media of claim 14, the capturing the content comprising capturing an image of the content, and the populating comprising displaying the image through the information interface.

18. A system for generating an information interface, comprising:
one or more processing devices configured to:
identify a selection of content within a webpage;
capture the content from the webpage;
generate an information interface for the content;
populate the information interface with the content;
display the information interface in a shared operating system interface through which multiple other information interfaces are displayed, wherein the shared operating system interface is rotated between the information interface and the other information interfaces;
automatically update the information interface with content from the webpage;
present an alert to a user that the information interface has been automatically updated;
responsive to identifying user input of a user search query through a search interface, and while the user is typing the user search query, provide a list of information interface suggestions corresponding to the user input, wherein each information interface suggestion in the list is a user-selectable item which describes a type of information interface comprising a topic that corresponds to the user input, wherein for each information interface suggestion, a selection of the information interface suggestion causes a corresponding information interface to be generated, wherein the corresponding information interface includes content captured from one or more associated webpages; and
responsive to receiving a selection of an information interface suggestion from the list of information interface suggestions, generate a second information interface that corresponds to the user input based upon the selected information interface suggestion.

19. The system of claim 18, the one or more processing devices further configured to:
identify a topic associated with the content;
retrieve supplemental content corresponding to the topic; and
update the information interface with the supplemental content.

20. The system of claim 19, wherein retrieve supplemental content comprises retrieve the supplemental content from a second source different than the webpage.

* * * * *